INVENTORS.
LAWRENCE E. CALSYN &
ROBERT W. LEWIS
BY
*Meyer, Tilberry & Body*
ATTORNEYS INVENTORS.
LAWRENCE E. CALSYN &
ROBERT W. LEWIS
BY
Meyer, Tilberry & Body
ATTORNEYS INVENTORS.
LAWRENCE E. CALSYN &
ROBERT W. LEWIS
BY
Meyer, Tilberry & Body
ATTORNEYS INVENTORS.
LAWRENCE E. CALSYN &
ROBERT W. LEWIS
BY
Meyer, Tilberry & Body
ATTORNEYS INVENTORS.
LAWRENCE E. CALSYN &
ROBERT W. LEWIS
BY
Meyer, Tilberry & Body
ATTORNEYS

3,559,078
FREQUENCY GENERATOR

Lawrence E. Calsyn, East Moline, Ill., and Robert W. Lewis, St. Louis, Mo., assignors, by mesne asisgnments, to Gulf + Western Industries, New York, N.Y., a corporation of Delaware Original application Sept. 1, 1964, Ser. No. 393,657. Divided and this application Feb. 9, 1968, Ser. No. 721,910
Int. Cl. H03k 3/64
U.S. Cl. 328—63 5 Claims

ABSTRACT OF THE DISCLOSURE

A frequency generator which is particularly applicable for use as a portion of a master traffic controller for providing cycle length determining signals for application to local traffic controllers. To this end, there is provided a frequency signal generating means, such as a phase-locked oscillator, connected to a commercial alternating current power supply source for continuously generating a frequency signal having a fixed frequency synchronized with the line frequency of the commercial power supply source. A counter serves to continuously count the pulsations of the generated frequency signal and provide an output count signal representative of the number of pulsations counted. A count selector serves to pass a predetermined count signal which is representative of a predetermined count of pulsations of the frequency signal. A bistable device, such as a bistable multivibrator circuit, is changed from one stable state to the other by successive predetermined count signals. On-off switching means, such as a silicon controlled rectifier, is alternately on and off in accordance with the stable conditions of the bistable device. The on-off switching means serves to alternately connect and disconnect an output circuit with a source of energy so that the output circuit carries a signal having a frequency which is dependent on the predetermined count signal, and which frequency is synchronized with the line frequency of the commercial power source.

This is a division of our copending application, Ser. No. 393,657, filed Sept. 1, 1964.

This invention relates to the art of frequency generators and, more particularly, to a frequency generator having an application for use in a traffic controller.

The frequency generator according to the present invention, although particularly adapted for use with traffic controllers for generating a cycle length determining signal for controlling the cycle length of each traffic signal cycle at an intersection under control of a local controller, is not limited to such use but may find application elsewhere in which need of a frequency generator is found.

For a given cycle length of all local controllers it is desirable that the traffic signals provide a smooth progression of traffic flow. Accordingly, all of the local controllers should preferably operate together in synchornism. The isolated traffic controllers which are operated by line power are synchronized to the line frequency; however, the master controlled local controllers are not necessarily synchronized with line frequency since their cycle length is determined by the master controller which may or may not be operated from power taken from the line source. Accordingly, it is desirable for a smooth progression of traffic flow that the cycle length determining signals generated by a master controller be synchronized with line frequency.

In accordance with the present invention there is provided a frequency generator which includes oscillator means for generating a signal of a predetermined frequency and counting means for counting the pulsations of the generated frequency and being operative to develop an output signal representative of the number of pulsations counted. Count signal passing means are provided for passing only a predetermined count signal representative of a predetermined count of the pulsations. Bistable means are provided responsive to each predetermined count signal for changing from one stable state condition to another. On-off switching means are also provided responsive to the condition of the bistable means so as to cause switching of the on-off switching means whereby the frequency of the switching is dependent on the predetermined count signal.

In accordance with another aspect of the present invention, the frequency generator described above is utilized as a cycle length determining signal generator in a traffic control system for purposes of developing a cycle length determining signal for communication to a local controller for controlling the cycle length of operation of the local controller.

The primary object of the present invention is to provide a frequency generator which is simple in construction and economical to manufacture.

Another object of the present invention is to provide a cycle length generator for developing cycle length determining signals for controlling the operation of local traffic controllers in a traffic control system in which the frequency of the cycle length determining signal is synchronized with the frequency of the line power source.

A still further object of the present invention is to provide a cycle length generator for a traffic control system in which the frequency of the cycle length determining signal developed is not subject to variations due to electro-mechanical discrepancies inherent in the use of generator motors known heretofore.

The invention may take physical form in certain parts and arrangement of parts, as well as different method steps, the preferred embodiments of which will be described in detail in this specification and illustrated in the accompanying drawings which form a part hereof and wherein:

FIG. 1 is a plan view schematically illustrating a pair of isolated local controllers and a pair of master controlled local controllers within a traffic control system;

FIGS. 2 and 2A together constitute a schematic circuit diagram partly in block diagram form illustrating a preferred embodiment of the present invention;

FIG. 3 graphically illustrates wave forms of various signals at points *a*, *b*, *c*, *d* and *e* in FIG. 2;

FIG. 4 graphically illustrates wave forms of output signals appearing across the output circuit of the cycle length generator illustrated in FIG. 2;

Figure 1:
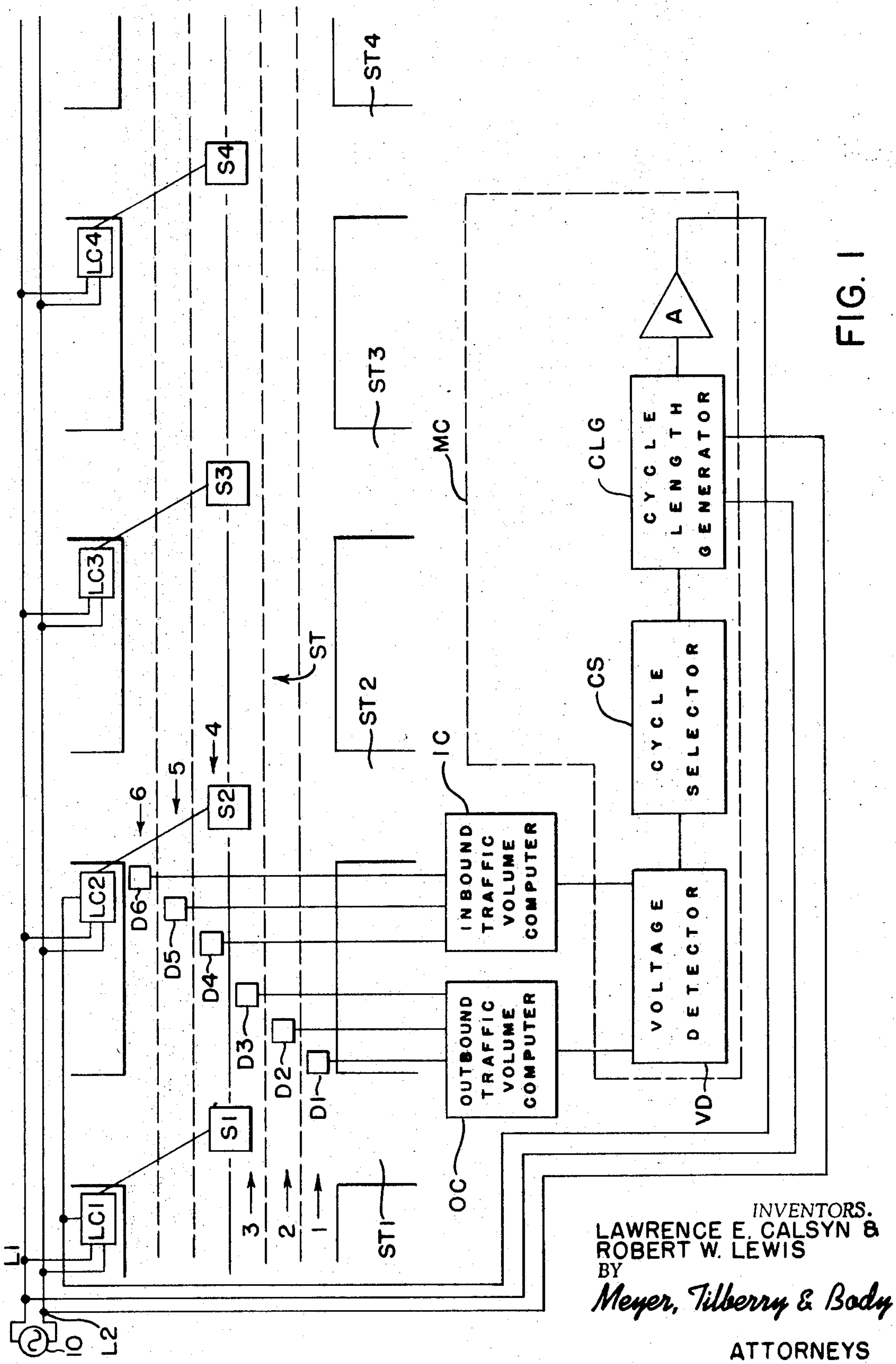

Referring now to the drawings wherein the showings are for the purpose of illustrating the preferred embodiments of the invention only and not for limiting same, FIG. 1 illustrates a six lane main thoroughfare or street ST and intersecting cross streets ST1, ST2, ST3 and ST4, each defining an intersection with the main street ST. Traffic signals S1 through S4 are positioned at each of the intersections for displaying go, caution and stop signals to the main street ST and its associated cross streets ST1 through ST4 during each cycle of traffic signals. The traffic signals S1 through S4 are controlled by associated local controllers LC1 through LC4, each interconnected with a traffic signal as illustrated in FIG. 1.

As illustrated in FIG. 1, the traffic control system includes traffic detectors D1 through D6 with detectors D1 through D3 located in the outbound lanes 1 through 3 and detectors D4 through D6 located in the inbound lanes 4 through 6 of the main street ST. The present invention is not limited to the particular traffic detector utilized as various detectors are available for use within the contemplation of one embodiment of the invention by which vehicles, streetcars, trolleys, buses or pedestrians are enabled to register their presence with a traffic actuated controller. Such detectors, for example, may include pressure sensitive vehicle detectors, presence or loop detectors, magnetic vehicle detectors of either the compensated magnetic or non-compensated magnetic variety, sound sensitive vehicle detectors, light sensitive vehicle detectors, radar vehicle detectors, non-directional or directional vehicle detectors, pedestrian detectors, and sampling detectors which are of any suitable type of a vehicle detector used to obtain traffic flow information for a traffic adjusted master controller.

A traffic volume computer is employed for each direction of traffic flow with an outbound traffic volume computer OC employed for the outbound lanes 1, 2 and 3, and an inbound volume computer IC being employed for the inbound lanes 4, 5 and 6. The detectors D1, D2 and D3 in the outbound lanes 1, 2 and 3 feed traffic information to the outbound computer OC and detectors D4, D5 and D6 in the inbound lanes 4, 5 and 6 feed traffic information to the outbound computer OC. It is within the contemplation of the present invention that if greater accuracy is desired detectors may be employed in all of the traveled lanes.

Each of the traffic volume computers OC and IC may be constructed to receive the output of as many as five traffic actuated detectors, such as the traffic volume computer described in the U.S. Patent application 341,833, entitled "Traffic Lane Control," filed Jan. 1, 1964, now abandoned, and assigned to the same assignee as the present invention. The function of the computer is to provide a direct current output potential proportional to traffic volume in one direction. The computers IC and OC receive signals from the detectors D1 through D6, reduce the signals to a pulse of short duration, eliminate most of the noise accompanying the signals, reduce the pulse by a factor of two, give the remaining pulses a definite duration, integrate the pulse count over a short interval, integrate the count over a long interval, and develop a potential proportional to the integrated count.

The output of each traffic volume computer, IC and OC, is applied to a simplified voltage detector VD which may comprise a pair of silicon diodes. Both voltages, indicative of traffic volume in each direction, are passed by the diodes with only the higher voltage being effectively passed to the cycle selector CS. The lower voltage has no further effect. The higher potential is used as a measure of traffic volume on the main thoroughfare ST and the cycle length is determined therefrom.

Figure 2:
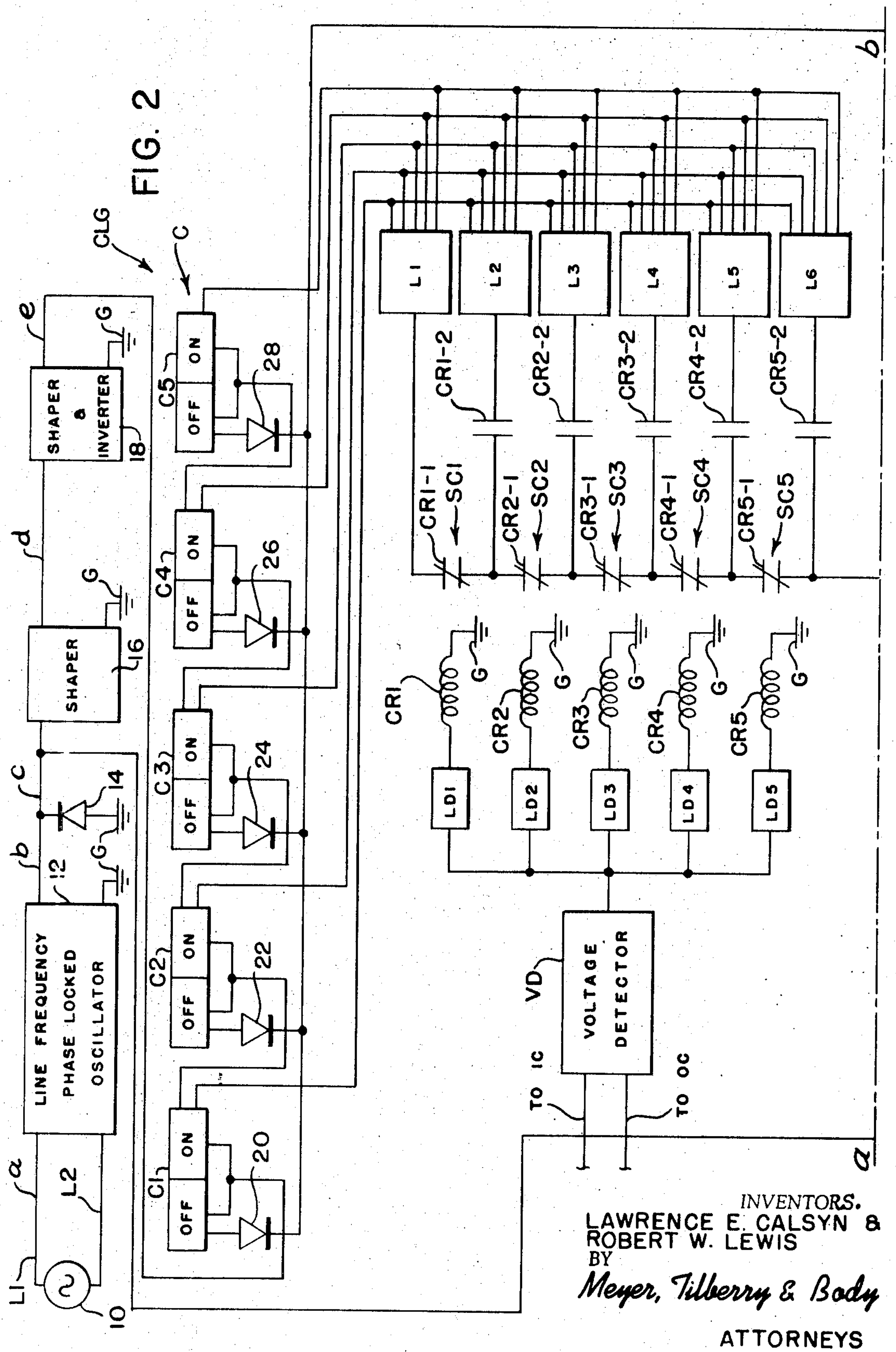

Referring now to FIG. 2, the cycle selector CS takes the form of five level detectors LD1 through LD5 and five count selectors SC1 through SC5, each connected with one of the level detectors. The output of the voltage detector VD is a potential representative of traffic in the heavier direction on main street ST and is applied simultaneously to all of the level detectors LD1 through LD5. Successive level detectors are biased with successively higher bias potentials producing a ladder effect. The bias potential for each level is adjustable so that different steps in traffic volume will be required to trigger the various level detectors. When the traffic volume is very low, as during the hours between midnight and early morning, none of the level detectors LD1 through LD5 is energized and the cycle length generator CLG develops a normal cycle length determining signal which will be described with greater particularity hereinafter. However, as the traffic volume increases the potential from the voltage detector VD may be sufficient to overcome the bias voltage on the first level detector LD1. When this occurs level detector LD1 energizes count selector SC1, which preferably takes the form of an on-off switching device such as a relay or a transistor. Energization of count selector SC1 serves to control the operation of the cycle length generator CLG so that a cycle length determining signal of a frequency different from that of the normal cycle length determining signal is developed. In like manner, as the traffic volume further increases level detectors LD2 through LD5 will become energized so as to energize their count selectors SC2 through SC5 respectively, for in turn controlling the operation of the cycle length generator for developing cycle length determining signals of different frequencies. This operation is explained in greater detail hereinafter with respect to the discussion of the cycle length generator CLG.

The cycle length determining signal developed by the cycle length generator CLG is communicated to the local controllers LC1 and LC2 via a suitable amplifier A for purposes of controlling the cycle length of local controllers LC1 and LC2.

In accordance with the present invention the cycle length generator CLG serves to develop cycle length determining signals of a frequency synchronized with the frequency of the line source 10 so that with a given cycle length for all local controllers, i.e., LC1 through LC4, a smooth progression of traffic flow results.

CYCLE LENGTH GENERATOR

Having now briefly described a traffic control system to which the present invention is particularly applicable, attention is hereinafter directed toward one embodiment thereof in the form of the cycle length generator CLG.

Figure 3:
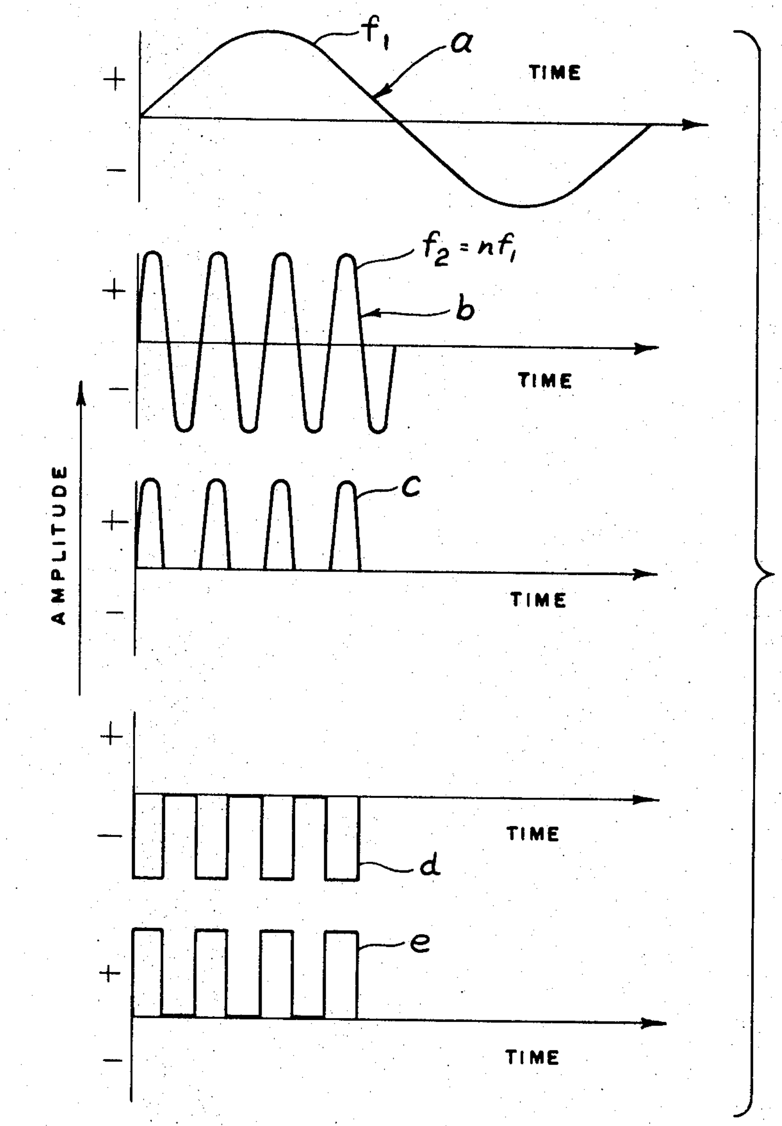

Referring now to FIG. 2, the cycle generator CLG includes an ascillator 12 connected across the main power supply source 10 via power lines L1 and L2. Oscillator 12 serves to convert the frequency $f_1$ of the source 10 to a higher frequency $f_2$, which is an even multiple of frequency $f_1$. Preferably, oscillator 12 operates so that it is phase-locked with the line frequency $f_1$. Phase-locking takes place at least once during each cycle of the line frequency $f_1$. For example, if the line frequency is 60 c.p.s. and the output frequency $f_2$ of oscillator 12 is the thirty-second harmonic thereof, or 1,920 c.p.s., then internally the oscillator divides the frequency of 1,920 c.p.s. or counts it down to line frequency of 60 c.p.s. This frequency is then phase-locked with the line frequency. Thus, every thirty-two cycles of the 1,920 c.p.s. frequency, or one alternation of the line frequency, the oscillator 12 is corrected or pulled into synchronism with the line frequency. The waveform *a* of the line frequency $f_1$ is a sinusoidal waveform and illustrated in FIG. 3. The waveform of the output signal developed by the oscillator 12 is shown by the waveform *b* in FIG. 3, which is also sinusoidal but of a frequency $f_2$ where $$f_2 - nf_1$$

wherein $n$ is an even number so that frequency $f_2$ is an even multiple of frequency $f_1$, the purpose of which will be described in greater detail hereinafter.

A diode 14 is connected across the output circuit of oscillator 12 and poled as illustrated in FIG. 2, for purposes of clipping the negative alternations of the output signal of oscillator 12. The waveform at point *c* in FIG. 2 is as shown by waveform *c* in FIG. 3. Thus, a plurality of positive pulses of sinusoidal configuration are applied to the input circuit of a shaper circuit 16 which serves to convert the sinusoidal waveform *c* into a square wave at point *d* as illustrated by the waveform *d* in FIG. 3. However, the shaper circuit 16, which may take the form of a solid state switching device including a PNP or NPN transistor, develops an output waveform which may be an inverted version of waveform *c*. Accordingly, a succeeding shaper and inverter circuit 18 is provided on the output circuit of shaper circuit 16 for purposes of inverting the square wave to obtain positive pulses. The waveform of the signal at point *e* at the output circuit of the shaper and inverter circuit is illustrated by the waveform *e* in FIG. 3.

The train of square wave pulses according to the waveform *e* at the output circuit of the shaper and inverter circuit 18 is applied to the input circuit of the first stage of a conventional five stage, solid state counting circuit C having the capability of counting to thirty-two. The counter C, which is hereinafter referred to as a pulse counter, takes the form of five off-on counter units C1 through C5. The counter units C1 through C5 preferably are of solid state circuitry taking the form of bistable multivibrator circuits known as flip-flop circuits. The last counting unit C5 has only one output circuit which is connected to the input circuit of each of six adjustable, predetermined count signal passing circuits L1 through L6. The first four counting units, i.e., C1 through C4, each have one output circuit connected to the input circuit of the succeeding counting unit and a second output circuit applied to each of the predetermined count signal passing circuits L1 through L6.

The pulse counter C serves to count the pulses to waveform *e* applied to the counter and for each count up to a maximum of thirty-two, the capability of a five stage counter, a different combination of output signals are applied to the input circuits of the predetermined count signal passing circuits L1 through L6.

The adjustable predetermined count signal passing circuits L1 through L6 are each adjustable to pass only one of the count signals developed by the pulse counter C. The count signal of the pulse counter C changes with each pulsation of waveform *e* being counted. Thus, for example, if eight pulses of waveform *e* have been counted a pulse count signal is applied to each of the input circuits of passing circuits L1 through L6, which signal is a combination of the five output signals from the five counter units C1 through C5. Each of the adjustable predetermined count signal passing circuits includes a circuit for passing only one of the count signals, i.e., only one of the combination of output signals from the counter units C1 to C5. Preferably, each of the adjustable count signal passing circuits L1 through L6 takes the form of a solid state logic circuit, such as a combination of diodes forming a steering circuit whereby only a particular count signal will be passed and all others will be blocked. Adjustable means such as a wiper arm may be utilized to vary the count signal passing characteristics of each of the circuits L1 through L6 so that each of the circuits may be adjusted to pass a desired count signal. For example, passing circuit L1 may be adjusted to pass only a count signal representative of eight pulses counted, i.e., eight pulsations of the waveform *e*. Similarly, the passing circuit L2 may be adjusted to pass only a count signal for a count of nine, L3 for a count of ten, L4 for a count of eleven, L5 for a count of twelve and L6 for a count of thirteen. The significance of setting the count passing circuits L1 through L6 at particular counts will be described in greater detail hereinafter.

The output circuit of adjustable predetermined count passing circuit L1 is connected directly to the input circuit of counter reset pulse generator PG via normally closed relay contacts CR1–1, CR2–1, CR3–1, CR4–1 and CR5–1 of count selectors SC1 through SC5. The output circuit of adjustable predetermined count passing circuit L2 is connected to the input circuit of the pulse generator PG via normally open relay contacts CR1–2, normally closed relay contacts CR2–1, normally closed relay contacts CR3–1, normally closed relay contacts CR4–1 and normally closed relay contacts CR5–1. Similarly, the output circuit of the count passing circuit L3 is connected to the input circuit of the pulse generator PG via normally open relay contacts CR2–2, normally closed relay contacts CR3–1, normally closed relay contacts CR4–1 and normally closed relay contacts CR5–1. Similarly, the output circuit of count passing circuit L4 is connected to the input circuit of the pulse generator PG via normally open relay contacts CR3–2, normally closed relay contacts CR4–1 and normally closed relay contacts CR5–1. The output circuit of count passing circuit L5 is connected to the input circuit of pulse generator PG via normally open relay contacts CR4–2 and normally closed relay contacts CR5–1. Lastly, the output circuit of count passing circuit L6 is connected to the input circuit of pulse generator PG via normally open relay contacts CR5–2.

As previously described, when the traffic volume on main street ST is very low, as during the hours between midnight and early morning, none of the level detectors LD1 through LD5 will be energized and, accordingly, none of the count selector relay coils CR1 through CR5 will be energized. Thus, all of the normally closed contacts CR1–1 through CR5–1 will be closed, as illustrated in FIG. 2, whereby a predetermined count signal corresponding to the count setting of the predetermined count passing circuit L1 will be passed and applied to the input circuit of the pulse generator PG. Also, as the traffic volume on the main street ST increases only one of the level detectors LD1 through LD5 will be energized. Thus, for example, if the traffic volume is sufficiently high, level detector LD2 will be energized as also will its associated relay coil CR2. Hence, the normally open relay contacts CR2–2 will be closed and the normally closed relay contacts CR2–1 will be open whereby a circuit is effected between the output circuit of the adjustable predetermined count passing circuit L3 and the input circuit of the pulse generator PG.

Figure 2A:
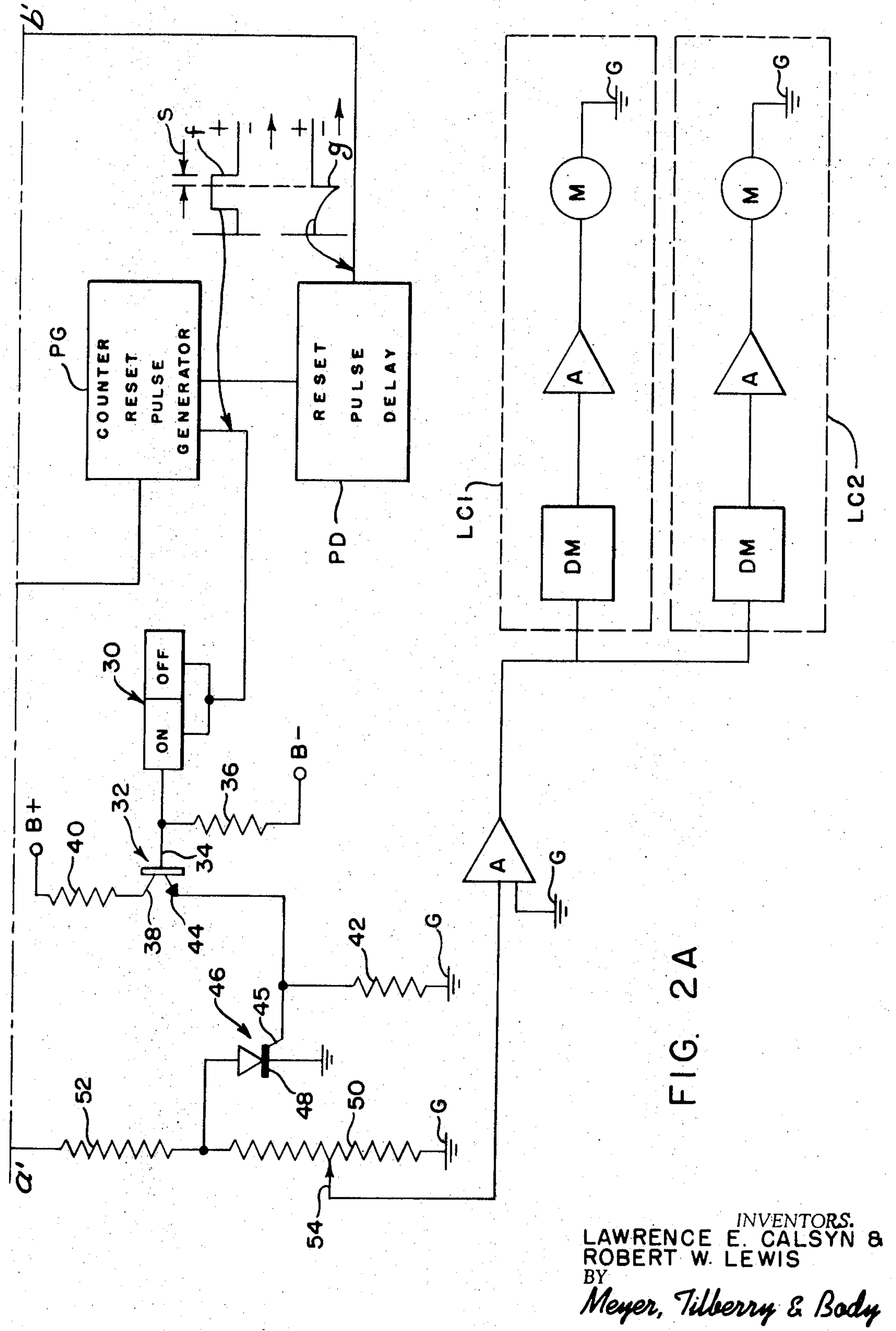

The counter reset pulse generator PG is responsive to whatever predetermined count signal is received at its input circuit from the adjustable predetermined count passing circuits L1 through L6, and develops an output trigger pulse of the wave form *f*, as illustrated in FIG. 2A. The reset pulse generator PG has two output circuits, one of which is connected to an input circuit of a reset pulse delay circuit PD, which serves to invert the signal pulse *f* to obtain a negative reset trigger pulse *g* having its leading edge delayed in time from that of the trigger pulse *f*. Preferably, both the pulse generator PG and the reset pulse delay circuit PD take the form of solid state circuitry which may, for example, include the use of either PNP or NPN switching transistors.

The reset trigger pulse *g* appearing at the output circuit of the reset pulse delay circuit PD is applied to the counter units C1 through C5 via steering diodes 20, 22, 24, 26 and 28 respectively. As illustrated in FIG. 2, the diodes are connected to the normally off portion of each of the counter units and, hence, if one of the units is in the stable state condition, as illustrated by the off-on labels on the counter units C1 through C5 in FIG. 2, no effect will result from the receipt of a negative trigger pulse. However, after a counting function at least one or more of the counter units will have an opposite stable state from that as illustrated in FIG. 2A, whereby the receipt of a negative trigger pulse will reset the counter C to the stable state illustrated by the labels off-on. Thus, it is seen that by providing a delayed reset trigger pulse *g* all of the counters C1 through C5 may be returned to their initial stable state for continuing counting functions. The reason for delaying the leading edge of reset pulse *g* is that the counter can more reliably be reset if the pulse *g* is applied after the pulse generator PG is activated by a count signal applied at its input circuit.

The trigger pulse *f* appearing on the output circuit of the pulse generator PG is also applied to the input circuit of a bistable circuit 30. The bistable circuit 30 is similar to each of the counter units C1 through C5 and is preferably a solid state bistable multivibrator circuit known as a flip-flop having two stable state conditions. The first state, for example, being an on-off condition as illustrated in FIG. 2 and the second being an off-on condition upon the receipt of a trigger pulse sufficient to cause a change in state.

The output circuit of the bistable circuit 30 is applied to the input circuit of an NPN transistor 32 having its base electrode 34 connected to a B— voltage supply source via a current limiting resistor 36 and its collector electrode 38 connected to a B+ voltage supply source via a current limiting resistor 40. The output circuit of the transistor 32 is connected across a load resistor 42 via the emitter electrode 44 of the transistor. In this manner, upon the receipt of a positive trigger pulse from the output circuit of the bistable circuit 30, the transistor 32 will be forwarded biased permitting current flow from the B+ voltage supply source through the resistor 40 and from the collector 38 to the emitter 44 of the transistor through the load resistor 42 to ground G. Thus, a positive voltage with respect to ground will appear across the load resistor 42.

The load resistor 42 is also connected between ground G and the gate 45 of a silicon controlled rectifier (SCR) 46, having its cathode 48 connected directly to ground G. The silicon controlled rectifier 46 is in turn connected in parallel across a potentiometer 50 which is connected between ground G and the output circuit of the oscillator 12 taken at a point after the inclusion of rectifying diode 14, as illustrated in FIG. 2, via a current limiting resistor 52. As will be described with greater particularity hereinafter, the output signal of the oscillator 12 according to waveform *c* in FIG. 3 will normally appear across the potentiometer 50 when the silicon controlled rectifier 46 is not conducting. However, when SCR 46 is conducting as upon the receipt of positive potential at its gate 45 from the output circuit of transistor 32, a short circuit will appear across the potentiometer 50 and the pulse wave form *c* will bypass potentiometer 50 and be applied directly to ground G.

The output circuit of the potentiometer 50, i.e., between ground G and the wiper arm 54 of the potentiometer, is connected to the input circuit of an amplifier A which serves to provide suitable amplification of output signals appearing across the output circuit of the potentiometer. The amplified signals are applied to the input circuits of the local controllers LC1 and LC2. Each of the local controllers LC1 and LC2 includes a demodulator circuit DM for demodulating output signals received from the output circuit of the potentiometer 50 and deriving the intelligence signals therefrom, which intelligence signals are then amplified by suitable amplifier A and applied to a cycle length timing motor M. Preferably each timing motor M is a synchronous motor having its output shaft speed proportional to the frequency of the intelligence signal received from the demodulator DM. The intelligence signal received is known as the cycle length determining signal.

OPERATION

Attention is now directed toward the operation of the cycle length generator CLG as applied to a traffic control system. As stated hereinbefore, each of the local controllers LC1 and LC2 is an automatic controller operated by a synchronous motor M, which will maintain a constant shaft speed governed by the frequency of the cycle length determining signal received. As is well known to those skilled in the art of traffic control, the cycle length is inversely proportional to the frequency of the received cycle length determining signal. This relationship may be expressed as follows:

$$C.L. - \frac{K}{f_3}$$

where C.L. is cycle length in seconds; K is a constant dependent on the parameters of the synchronous motor operated local controller; and $f_3$ is the frequency in cycles per second of the received cycle length determining signal.

The value of constant K may be determined by operating a local controller such as LC1 or LC2 by applying, for example, line frequency as the cycle length determining signal to the synchronous motor M and then noting the cycle length of operation. Thus, if a cycle length of 80 seconds is obtained by applying a 60 c.p.s. line frequency signal, the constant K is equal to 4,800.

From experience traffic engineers have found that a 40 second cycle length is desirable for smooth traffic progression during low traffic volume periods, and as the volume of traffic increases the need for an increased cycle length arises. Traffic engineers have found it desirable to provide traffic cycle lengths in the range from approximately 40 seconds to 120 seconds to accommodate various volumes of traffic to obtain smooth progression of traffic flow. For local controllers having a constant K equal to 4,800 the frequency $f_3$ of a cycle length determining signal to obtain various desired cycle lengths is found in Table I.

TABLE I

| Cycle length (C.L.) in seconds | Frequency ($f_3$) in cycles per second | Pulse counter setting |
|---|---|---|
| 40 | 120.0 | 8 |
| 45 | 106.6666 | 9 |
| 50 | 96.0 | 10 |
| 55 | 87.2727 | 11 |
| 60 | 80.0 | 12 |
| 65 | 73.8461 | 13 |
| 70 | 68.5714 | 14 |
| 75 | 64.0 | 15 |
| 80 | 60.0 | 16 |
| 85 | 56.4705 | 17 |
| 90 | 53.333 | 18 |
| 100 | 48.0 | 20 |
| 110 | 43.6363 | 22 |
| 120 | 40.0 | 24 |

In accordance with the present invention the cycle length determining frequency $f_3$ is equal to the frequency of switching of the silicon controlled rectifier SCR 46 which, as described hereinafter, is dependent on the number of pulsations of wave form *e* that are required to be counted by pulse counter C in order to pass a predetermined pulse count to the pulse generator PG.

The frequency $f_2$ of the output signal developed by the oscillator 12 is preferably the lowest even multiple of line frequency $f_1$ that can be divided by all of the various frequencies used to determine the desirable cycle lengths, i.e., refer to Table I from which it will be noted that the lowest frequency $f_2$ that can be divided by an even multiple of each of the cycle length determining frequencies $f_3$ is 1,920 c.p.s., which is the thirty-second harmonic of a line frequency $f_1$ of 60 c.p.s. The reason for the frequency of the output signal of oscillator 12 being the lowest even multiple of line frequency $f_1$ is that in this manner the oscillator 12 is able to phase-lock a lower frequency to the frequency of the line source, i.e., for example, if only the thirty-second harmonic is used, as in the case for a 60 c.p.s. line frequency $f_1$, phase-locking will occur within oscillator 12 once every thirty-two cycles of the frequency $f_2$ of the output signal of oscillator 12 to every one cycle of the line frequency $f_1$. However, if the sixty-fourth harmonic is utilized, i.e., 3,820 c.p.s. phase-locking within the oscillator 12 will occur only half as often, once every sixty-fourth cycle of the output frequency $f_2$ of the output signal for every one cycle of line frequency $f_1$.

The reason for the output frequency $f_2$ of the oscillator 12 being an even multiple of line frequency $f_1$ is that in accordance with the present invention the pulses of wave form *e* (see FIG. 3), are counted for a predetermined count so that the silicon controlled rectifier SCR 46 is alternately conducting for a period determined by the count and non-conducting for a period determined by the count. This may be illustrated more clearly with reference to FIG. 4. If the pulse train *c* is of a frequency of 1,920 c.p.s. and if alternately eight pulses are passed to ground G by SCR 46 and eight pulses are blocked i.e., appearing across potentiometer 50, then the envelope $h$ of the wave form will be a square wave of 120 c.p.s. frequency Similarly, with reference to wave form $i$ in FIG. 4, there is illustrated a wave form which occurs if nine pulses of a 1,920 c.p.s. signal are alternately passed and blocked. Such a wave form $i$ for a frequency $f_2$ of 1,920 c.p.s. will be of a frequency of 106.6666 c.p.s. With reference to Table I, it will be noted that in the third column there is illustrated the count setting required for obtaining a desired cycle length determining frequency for a particular cycle length. The derivation of various counts may be expressed as follows:

$$\text{Count} = \frac{f_2}{2f_3}$$

where $f_2$ is the frequency in cycles per second of the output signal developed by oscillator 12; $f_3$ is the frequency in cycles per second of the cycle length determining signal applied to motors M within the local controllers LC1 and LC2; but, $$f_3 = \frac{K}{C.L.}$$

therefore, $$\text{Count} = \frac{f_2(C.L.)}{2K}$$

where C.L. is cycle length in seconds; K is a constant dependent on the parameters of the synchronous motor operated local controller; and $f_2$ is the requency in cycles per second of the output signal of oscillator 12.

Having described the relationship between count settings of the adjustable predetermined count passing circuits L1 through L6, and the frequencies $f_3$ for obtaining various desired cycle lengths, discussion will now be more particularly directed toward the operation of the cycle length generator CLG. Each of the adjustable predetermined count passing circuits L1 through L6 should be adjusted for a desired count as illustrated in Table I for desired cycle lengths. Thus, for example, the adjustable predetermined count passing circuit L1 may be set for a count of eight corresponding with a cycle length of 40 seconds which requires a cycle length determining signal of 120 c.p.s. Similarly, according to the Table I, the adjustable predetermined count passing circuits L2 through L6 may be set for counts of 9, 10, 11, 12 and 13 respectively, although other of the counts illustrated in Table I may also be set as desired.

If the traffic volume in the incoming and outgoing lanes of the main street ST is low, the output potential of the voltage VD may not be sufficiently high to energize any of the level detectors LD1 through LD5. Accordingly, all of the normally closed relay contacts CR1–1 through CR5–1 will be closed and all of the normally open contacts CR1–2 through CR5–2 will be open, as illustrated in FIG. 2. Thus, only the adjustable predetermined count passing circuit L1 is effectively in the circuit for purposes of passing a count signal to the pulse generator PG. Since the count passing circuit L1 is set for a count of eight, then a count signal will be passed only when the pulse counter C has counted eight pulses of the wave form $e$, see FIG. 3. Accordingly, a count signal will be applied to the input circuit of the pulse generator PG which serves to generate a trigger pulse $f$ which is applied to a reset delay circuit PD. The reset pulse delay circuit PD serves to develop a negative trigger signal $g$ having its leading edge delayed in time by a period $s$ which is then applied via steering circuits 20 through 28 to the pulse counter units C1 through C5. In this manner all of the pulse counter units C1 through C5 are reset to their initial stable state as illustrated by the off-on relationships shown in FIG. 2.

The trigger pulse $f$ is also applied to the input circuit of the on-off bistable circuit 30, which is triggered to its second stable state condition, i.e., its off-on state as distinguished from the on-off state illustrated in FIG. 2. As is conventional, bistable circuit 30 in its off-on condition will exhibit a positive potential at its output circuit which is applied to the base 34 of transistor 32. This will forward bias transistor 32. Transistor 32 will be conductive and current will flow from the B+ power source through the current limiting resistor 40, the collector 38 to emitter 44 electrodes so as to develop a positive voltage with respect to ground across the load resistor 42. In this manner positive potential is applied to the gate 45 of the silicon control rectifier SCR 46 rendering the silicon control rectifier forward biased. Thus, the potentiometer 50 is short circuited and the output signal according to wave form $c$ developed by the oscillator 12 will bypass the potentiometer 50 and flow to ground G. After eight more pulses of the wave form $e$ have been counted by the pulse counter C, a second trigger pulse will be generated by the pulse generator PG which will change the state of the bistable circuit 30 to its initial stable state, i.e., the on-off state illustrated in FIG. 2. Thus, as is conventional, the output signal of the bistable circuit 30 will no longer be a positive potential of sufficient magnitude to forward bias the transistor 32 and, hence, the transistor 32 will become reversed biased due to the large negative reversing bias source B— applied to its base 34. Accordingly, the transistor 32 will cease to conduct, removing the positive potential to ground across the load resistor 42. The positive potential is removed from the gate 45 of the silicon control rectifier SCR 46 rendering the SCR 46 non-conductive. This removes the short circuit across the potentiometer 50. Thus, the output signal wave form $c$ of the output signal of the oscillator 12 is applied across the resistance of the potentiometer 50 to ground. It is seen therefore that the frequency of the switching of the on-off switching means, silicon control rectifier SCR 46, is dependent on the predetermined count signal passed by the adjustable predetermined count passing circuit L1.

With reference now to the Table I, it is seen that for a count of eight for a frequency $f_2$ of 1,920 c.p.s. the frequency of switching of the silicon control rectifier SCR 46 will be 120 c.p.s. This is the cycle length determining frequency $f_3$.

Figure 4:
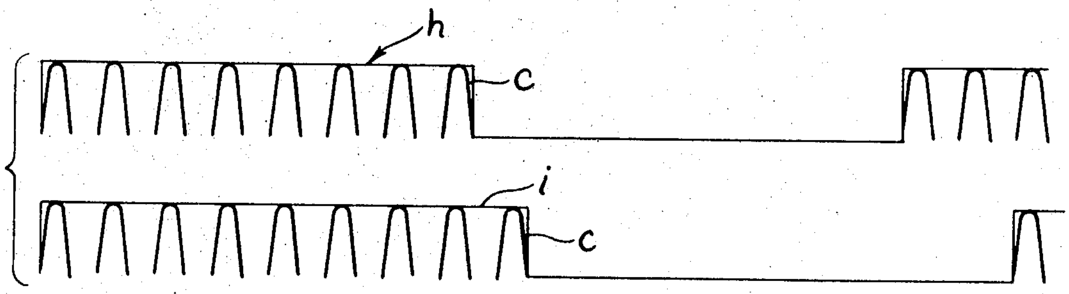
Figure 5:
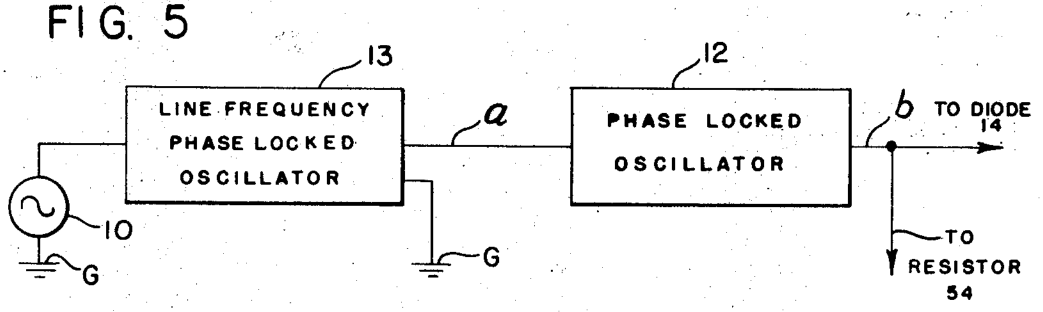
FIG. 5 illustrates another embodiment of the oscillator illustrated in FIG. 2.
Figure 6:
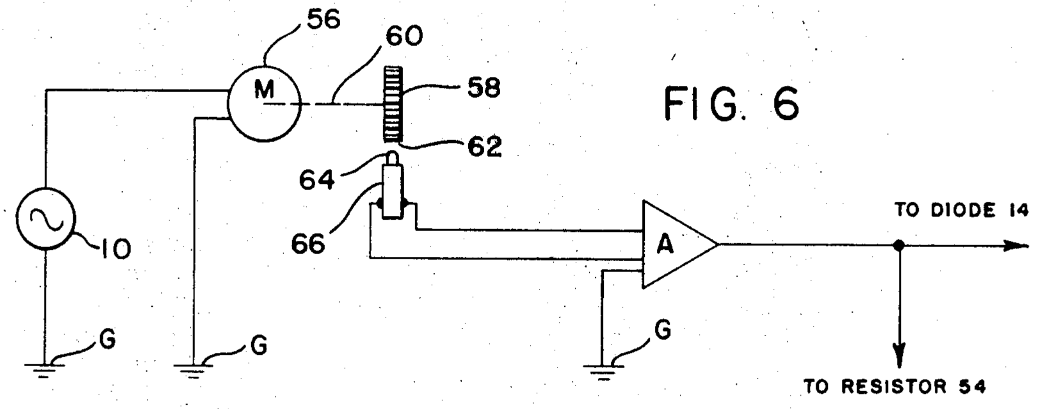
FIG. 6 illustrates a still further embodiment of the oscillator illustrated in FIG. 2.
Figure 7:
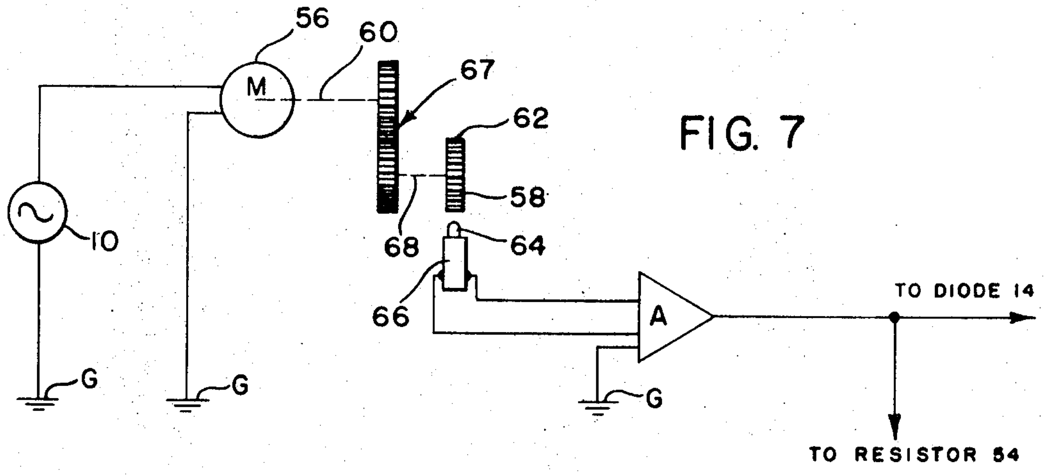
FIG. 7 illustrates another embodiment of the oscillator illustrated in FIG. 2.

The on-off switching of the silicon control rectifier SCR 46 results in an output signal across the potentiometer 50, i.e., between ground G and wiper arm 54 of a wave form according to that illustrated by the wave form $h$ in FIG. 4. As illustrated in FIG. 4, for a frequency $f_2$ equal to 1,920 c.p.s. the wave form takes the form of alternately the presence of eight pulsations and the absence of eight pulsations of wave form $c$. The envelope $h$ of the wave form $c$ takes the form of a square wave having a freqeuncy, for a count of eight, of 120 c.p.s. The 1,920 c.p.s. frequency serves as a carrier signal for transmitting the intelligence, i.e., envelope $h$, to the remote local controllers via either metallic interconnected wire lines or radio as desired. The output signal of the potentiometer 50 is amplified by suitable amplifier A and then applied to the various local controllers LC1 and LC2. Each of the local controllers is provided with a demodulator which may take the form of a suitable filter for bypassing the 1,920 c.p.s. signal to ground and transmitting only the intelligence according to the envelope wave form $h$ through a suitable amplifier A to a synchronous motor M. The effect of the demodulation and amplification of the wave form $h$ tends to distort the square wave form $h$ into a sinusoidal signal. If desired, a different carrier signal other than the 1,920 c.p.s. signal derived from the oscillator 12 can be used. Also, if feasible for a particular application no carrier signal need be used. Thus, the connection between the output circuit of the oscillator 12 and the potentiometer 50 may be disconnected and applied to one terminal of a DC power source, which in accordance with on-off switching of the silicon control rectifier SCR 46 will merely develop a DC square wave according to envelope wave form *h* across the output circuit of potentiometer 50 of a frequency $f_3$ in accordance with the on-off switching of the silicon control rectifiers SCR 46.

The description of operation thus far has been directed toward the events occurring if the traffic volume on the main street ST is sufficiently low that none of the level detectors LD1 through LD5 is energized. The operation which ensues if the volume is sufficiently high that one of the level detectors LD1 through LD5 is energized, is quite similar to that as described above. For example, if the level detector LD1 is energized, then the relay coil CR1 will also be energized. Accordingly, the normally closed relay contacts CR1–1 will be open and the normally open relay contacts CR1–2 will be closed. The only count passing circuit which will be effective is L2, which if set, for example, for a count of nine will provide a count signal to the input circuit of the pulse generator PG whenever the count signal output of the pulse counter C is representative of nine counts of the pulsations of the wave form *e*. Thus, with reference to FIG. 4, alternately the presence of nine pulses of the wave form *c* and then the absence of nine pulses of the wave form *c* appear across the output circuit of the potentiometer 50. The envelope wave form *i* of this signal for a frequency $f_2$ of 1,920 c.p.s. and a count of nine is a square wave of a frequency of 106.667 c.p.s. corresponding to a cycle length of 45 seconds. The operation of the cycle length generator CLG which ensues if either of the level detectors LD2 through LD5 is energized, is similar to that as described above and no further description is believed necessary for a clear and concise understanding of the invention.

Although the invention has been shown in connection with preferred embodiments it will be readily apparent to those skilled in the art that various changes in forms of methods and arrangement of parts may be made to suit requirements without departing from the spirit and scope of the invention as defined by the appended claims.

We claim:

1. A frequency generator comprising: terminals for connection to a source of commercial alternating current power, oscillator means connected to such terminals for continuously generating a frequency signal of a fixed frequency synchronized with the frequency of said commercial alternating-current power source, counting means for continuously counting the pulsations of said generated frequency signal and developing an output count signal representative of the number of pulsations counted, predetermined count signal passing means for passing only a predetermined count signal representative of a predetermined count of pulsations, bistable means having alternating a first stable state condition and a second stable state condition and responsive to each predetermined count signal for changing from one stable state condition to the other, and on-off switching means responsive to the condition of said bistable means so as to be on when said bistable means is in said first stable state condition and off when said bistable means is in said second stable state condition, whereby the frequency of switching of said on-off switching means is dependent on the predetermined count signal and is synchronized with the frequency of said alternating-current power source.

2. A frequency generator as set forth in claim 1 including resetting means responsive to said predetermined count signal for resetting said counting means to again begin counting the pulsations of said generated signal.

3. A frequency generator as set forth in claim 1 including pulse generating means responsive to each predetermined count signal for developing an output trigger pulse and pulse delay means responsive to said trigger pulse for developing a resetting trigger pulse delayed in time with respect to said trigger pulse for resetting said counting means.

4. A frequency generator as set forth in claim 1 including output circuit means, said switching means adapted to alernately connect and disconnect said output circuit means with a source of energy so as to develop an output signal exhibiting a frequency dependent on the frequency of switching of said on-off switching means.

5. A frequency generator as set forth in claim 1 including a plurality of traffic level detectors, each actuated at a different traffic level, wherein the count signal passing means includes circuits each adapted to pass only one of the count signals developed by the counting means and are successively responsive to said level detectors for causing the number of count signals occurring in succession to depend upon the level detector actuation.

References Cited

UNITED STATES PATENTS

| | | | |
|---|---|---|---|
| 2,804,606 | 8/1957 | Reaves ___________ | 328—153X |
| 3,054,960 | 9/1962 | Pearlman _________ | 328—153X |
| 3,267,424 | 8/1966 | Brockett et al. ______ | 307—223 |

JOHN S. HEYMAN, Primary Examiner

U.S. Cl. X.R.

328—48, 74, 105, 153